United States Patent
Yamauchi et al.

(10) Patent No.: US 12,025,217 B2
(45) Date of Patent: Jul. 2, 2024

(54) CONTROL APPARATUS FOR VEHICLE

(71) Applicant: TOYOTA JIDOSHA KABUSHIKI KAISHA, Toyota (JP)

(72) Inventors: Yusuke Yamauchi, Chita-gun (JP); Takashi Yuma, Toyokawa (JP); Hiroshi Shibata, Seto (JP); Kenyu Suzuki, Iwakura (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/513,899

(22) Filed: Nov. 20, 2023

(65) Prior Publication Data
US 2024/0183441 A1 Jun. 6, 2024

(30) Foreign Application Priority Data
Dec. 6, 2022 (JP) .................. 2022-195198

(51) Int. Cl.
*F16H 59/10* (2006.01)
*F16H 61/12* (2010.01)

(52) U.S. Cl.
CPC .......... *F16H 59/105* (2013.01); *F16H 61/12* (2013.01); *F16H 2061/1292* (2013.01)

(58) Field of Classification Search
CPC . F16H 59/105; F16H 61/12; F16H 2061/1292
USPC ..................................... 74/473.12
See application file for complete search history.

(56) References Cited

U.S. PATENT DOCUMENTS

| 2013/0000436 | A1* | 1/2013 | Ueno | F16H 61/12 74/473.12 |
| 2014/0007728 | A1* | 1/2014 | Kim | F16H 61/12 74/473.12 |
| 2014/0371960 | A1* | 12/2014 | Lee | B60W 10/02 903/903 |
| 2019/0165602 | A1 | 5/2019 | Morita | |

FOREIGN PATENT DOCUMENTS

JP 2014-238133 A 12/2014
JP 2018-013136 A 1/2018

* cited by examiner

*Primary Examiner* — Colby M Hansen
(74) *Attorney, Agent, or Firm* — Oblon, McClelland, Maier & Neustadt, L.L.P.

(57) ABSTRACT

A vehicle control apparatus includes: (a) a shift control portion for controlling switching of a power transmission apparatus between a parking position and a non-parking position; (b) a fail-safe portion for executing a fail-safe operation for inhibiting an electric actuator from being re-driven, when detecting an abnormality of the electric actuator; (c) a power-supply control portion for switching a supplier of an electric power to the electric actuator, from a first power supply to a second power supply, in case of determining a power supply failure of the first power supply; and (d) an abnormality-detection stop portion configured, in case of occurrence of a power-supply failure state of the first power supply during the switching from the non-parking position to the parking position, to stop the fail-safe portion from detecting the abnormality of the electric actuator, until the electric power supplier has been switched to the second power supply.

6 Claims, 4 Drawing Sheets

CONTROL APPARATUS FOR VEHICLE

This application claims priority from Japanese Patent Application No. 2022-195198 filed on Dec. 6, 2022, the disclosure of which is herein incorporated by reference in its entirety.

FIELD OF THE INVENTION

The present invention relates to a control apparatus for a vehicle that includes a switch device configured to switch a shift position of a power transmission apparatus by operation of an electric actuator.

BACKGROUND OF THE INVENTION

There is well-known a control apparatus for a vehicle that includes (i) a drive wheel, (ii) a rotary member that is to be rotated together with the drive wheels, (iii) a power source, (iv) a power transmission apparatus configured to transmit a power from the power source toward the drive wheel, (v) a switch device configured to switch a shift position of the power transmission apparatus by operation of an electric actuator, (vi) a first power supply configured to supply an electric power for driving the electric actuator and (vii) a second power supply configured to supply the electric power for driving the electric actuator during a power-supply failure state in which the electric power is not supplied from the first power supply. JP2018-13136A discloses a CPU for a vehicle, which corresponds to an example of such a control apparatus. In this Japanese Patent Application Publication, when a vehicle driver issues a shift instruction to switch a shift range of the power transmission apparatus to a parking range, if a power supply failure of a battery corresponding to the first power supply is detected, the CPU commands a backup power supply corresponding to the second power supply, to start supplying the electric power to a shift control portion, and commands the shift control portion to switch the shift range of the power transmission apparatus to the parking range.

SUMMARY OF THE INVENTION

The control apparatus is configured to control switching of the shift position of the power transmission apparatus between a parking position and a non-parking position that is other than the parking position, such that the rotary member (that is to be rotated together with the drive wheels) is mechanically fixed and unrotatable when the power transmission apparatus is in the parking position. When an abnormal condition of the electric actuator is detected with drive of the electric actuator being stagnant for at least a predetermined length of time during the switching of the shift position of the power transmission apparatus between the parking position and the non-parking position, it might be possible to execute a fail-safe operation for inhibiting the electric actuator from being re-driven. Further, when the power supply failure of the first power supply is determined during the power-supply failure state, it might be possible to switch a supplier of the electric power to the electric actuator, from the first power supply to the second power supply. By the way, the drive of the electric actuator is stopped, in case of occurrence of the power-supply failure state during the switching of the shift position of the power transmission apparatus from the non-parking position to the parking position. In this instance, if the abnormal condition of the electric actuator is detected before the supplier of the electric power to the electric actuator has been switched to the second power supply as a result of determination of the power supply failure of the first power supply, the electric actuator is inhibited from being re-driven due to execution of the fail-safe operation. In that case, even if the supplier of the electric power has been successfully switched to the second power supply, the switching of the shift position to the parking position could not be made by the re-drive of the electric actuator.

The present invention was made in view of the background art described above. It is therefore an object of the present invention to provide a vehicle control apparatus capable of switching the shift position of the power transmission apparatus from the non-parking position to the parking position in case of occurrence of the power-supply failure state during switching of the shift position from the non-parking position to the parking position.

The object indicated above is achieved according to the following aspects of the present invention.

According to a first aspect of the invention, there is provided a control apparatus for a vehicle that includes (i) a drive wheel, (ii) a rotary member that is to be rotated together with the drive wheel, (iii) a power source, (iv) a power transmission apparatus configured to transmit a power from the power source toward the drive wheel, (v) a switch device configured to switch a shift position of the power transmission apparatus by operation of an electric actuator, (vi) a first power supply configured to supply an electric power for driving the electric actuator and (vii) a second power supply configured to supply the electric power for driving the electric actuator during a power-supply failure state in which the electric power is not supplied from the first power supply. The control apparatus includes: (a) a shift control portion configured to control switching of the shift position of the power transmission apparatus between a parking position and a non-parking position that is other than the parking position, such that the rotary member is mechanically fixed and unrotatable when the power transmission apparatus is in the parking position; (b) a fail-safe portion configured to execute a fail-safe operation for inhibiting the electric actuator from being re-driven, when detecting an abnormal condition of the electric actuator with drive of the electric actuator being stagnant for at least a predetermined length of time during the switching of the shift position of the power transmission apparatus between the parking position and the non-parking position; (c) a power-supply control portion configured to switch a supplier of the electric power to the electric actuator, from the first power supply to the second power supply, in case of determining a power supply failure of the first power supply during the power-supply failure state; and (d) an abnormality-detection stop portion configured, in case of occurrence of the power-supply failure state during the switching of the shift position of the power transmission apparatus from the non-parking position to the parking position, to stop the fail-safe portion from detecting the abnormal condition of the electric actuator, until the supplier of the electric power to the electric actuator has been switched to the second power supply by the power-supply control portion.

According to a second aspect of the invention, in the control apparatus according to the first aspect of the invention, the power-supply control portion is configured to determine the occurrence of the power-supply failure state when an electric voltage of the first power supply is not higher than a predetermined voltage value, and to determine the power supply failure of the first power supply when the occurrence of the power-supply failure state has lasted for at least a predetermined failure determination time that is longer than the predetermined length of time, wherein the power-supply control portion is configured to provisionally determine the power supply failure of the first power supply when the occurrence of the power-supply failure state has lasted for at least a predetermined failure provisional determination time that is shorter than the predetermined length of time, and wherein the abnormality-detection stop portion is configured to stop the fail-safe portion from detecting the abnormal condition of the electric actuator, since the power supply failure of the first power supply has been provisionally determined by the power-supply control portion, until the supplier of the electric power to the electric actuator has been switched from the first power supply to the second power supply by the power-supply control portion.

According to a third aspect of the invention, in the control apparatus according to the first aspect of the invention, the power-supply control portion is configured to determine the power supply failure of the first power supply when an electric voltage of the first power supply has not been higher than a predetermined first voltage value for at least a predetermined failure determination time that is longer than the predetermined length of time, wherein the power-supply control portion is configured to provisionally determine the power supply failure of the first power supply when the electric voltage of the first power supply has not been higher than a predetermined second voltage value that is higher than the predetermined first voltage value, for at least a predetermined failure provisional determination time that is shorter than the predetermined length of time.

According to a fourth aspect of the invention, in the control apparatus according to any one of the first through third aspects of the invention, the fail-safe portion is configured to execute the fail-safe operation in case of the occurrence of the power-supply failure state when the first power supply is used as the supplier of the electric power to the electric actuator by the power-supply control portion, wherein the abnormality-detection stop portion is configured, in the case of the occurrence of the power-supply failure state during the switching of the shift position of the power transmission apparatus from the non-parking position to the parking position, to cause the power-supply control portion to stop using the first power supply until the supplier of the electric power to the electric actuator has been switched to the second power supply by the power-supply control portion.

According to a fifth aspect of the invention, in the control apparatus according to any one of the first through fourth aspects of the invention, in the case of the occurrence of the power-supply failure state during the switching of the shift position of the power transmission apparatus from the non-parking position to the parking position, when the supplier of the electric power to the electric actuator has been switched to the second power supply by the power-supply control portion, the shift control portion is configured to re-drive the electric actuator so as to switch the shift position of the power transmission apparatus to the parking position.

According to a sixth aspect of the invention, in the control apparatus according to the fifth aspect of the invention, the shift control portion is configured, when re-driving the electric actuator, to calculate an amount of the drive of the electric actuator to the parking position, by using (a) a drive information of the electric actuator at a point of time at which the drive of the electric actuator has become stagnant due to the occurrence of the power-supply failure state and (b) an operation information of the electric actuator during stagnation of the drive of the electric actuator.

In the control apparatus according to the first aspect of the invention, in case of the occurrence of the power-supply failure state during the switching of the shift position of the power transmission apparatus from the non-parking position to the parking position, the abnormal condition of the electric actuator with the drive of the electric actuator being stagnant for at least the predetermined length of time, is not detected, until the supplier of the electric power to the electric actuator has been switched to the second power supply. Owing to this control arrangement, when the power supply failure of the first power supply is determined during the power-supply failure state, the fail-safe operation is not executed until the supplier of the electric power to the electric actuator has been switched to the second power supply, so that the re-drive of the electric actuator is enabled when the supplier of the electric power to the electric actuator has been switched to the second power supply. It is therefore possible to switch the shift position of the power transmission apparatus from the non-parking position to the parking position in case of occurrence of the power-supply failure state during the switching of the shift position from the non-parking position to the parking position.

In the control apparatus according to the second aspect of the invention, the power supply failure of the first power supply is provisionally determined when the occurrence of the power-supply failure state has lasted for at least the predetermined failure provisional determination time, wherein the predetermined failure provisional determination time is shorter than the predetermined length of time that is used for detection of the abnormal condition of the electric actuator. Further, the abnormal condition of the electric actuator is not detected since the provisional determination of the power supply failure of the first power supply is made until the supplier of the electric power to the electric actuator has been switched to the second power supply. Owing to this arrangement, the provisional determination of the power supply failure of the first power supply is made at an earlier time than the detection of the abnormal condition of the electric actuator, so that it is possible to reliably avoid the fail-safe operation being executed when the supplier of the electric power to the electric actuator has been switched to the second power supply.

In the control apparatus according to the third aspect of the invention, the provisional determination of the power supply failure of the first power supply is made when the electric voltage of the first power supply has not been higher than the predetermined second voltage value for at least the predetermined failure provisional determination time, wherein the predetermined second voltage value is higher than the predetermined first voltage value that is used for the non-provisional determination of the power supply failure of the first power supply, and wherein the predetermined failure provisional determination time is shorter than the predetermined length of time that is used for detection of the abnormal condition of the electric actuator. Owing to this arrangement, the provisional determination of the power supply failure of the first power supply is made at a further earlier time than the detection of the abnormal condition of the electric actuator, so that it is possible to extend a range in which the abnormal condition of the electric actuator is not detected.

In the control apparatus according to the fourth aspect of the invention, in the case of the occurrence of the power-supply failure state during the switching of the shift position of the power transmission apparatus from the non-parking position to the parking position, the use of the first power supply is stopped until the supplier of the electric power to the electric actuator has been switched to the second power supply. Owing to this arrangement, when the first power supply is used as the supplier of the electric power to electric actuator, the fail-safe operation due to the occurrence of the power-supply failure state is not executed.

In the control apparatus according to the fifth aspect of the invention, in the case of the occurrence of the power-supply failure state during the switching of the shift position of the power transmission apparatus from the non-parking position to the parking position, when the supplier of the electric power to the electric actuator has been switched to the second power supply, the electric actuator is re-driven so as to switch the shift position of the power transmission apparatus to the parking position. Owing to this arrangement, the shift position of the power transmission apparatus is switched to the parking position after the supplier of the electric power to the electric actuator has been switched to the second power supply.

In the control apparatus according to the sixth aspect of the invention, when the electric actuator is to be re-driven, the amount of the drive of the electric actuator to the parking position is calculated by using (a) the drive information of the electric actuator at the point of time at which the drive of the electric actuator has become stagnant due to the occurrence of the power-supply failure state and (b) the operation information of the electric actuator during stagnation of the drive of the electric actuator. Owing to this arrangement, the electric actuator is appropriately driven such that the shift position of the power transmission apparatus can be switched to the parking position after the supplier of the electric power to the electric actuator has been switched to the second power supply.

DETAILED DESCRIPTION OF PREFERRED EMBODIMENT

In the embodiment of the present invention, the power source is an engine that generates a power by combustion of a fuel. Further, the vehicle may include an electric motor or the like as the power source, in addition to or in place of the engine.

The power transmission apparatus includes an automatic transmission, for example. The automatic transmission may be constituted by a known automatic transmission of planetary gear type, a known belt-type continuously variable transmission, a known synchronous mesh twin shaft parallel axis-type automatic transmission, a known DCT (Dual Clutch Transmission), a known electrically-operated continuously variable transmission, or a known transmission in which the electrically-operated continuously variable transmission and the automatic transmission of planetary gear type are arranged in series, for example.

Hereinafter, the preferred embodiment of the invention will be described in detail with reference to the accompanying drawings.

EMBODIMENT

Figure 1:
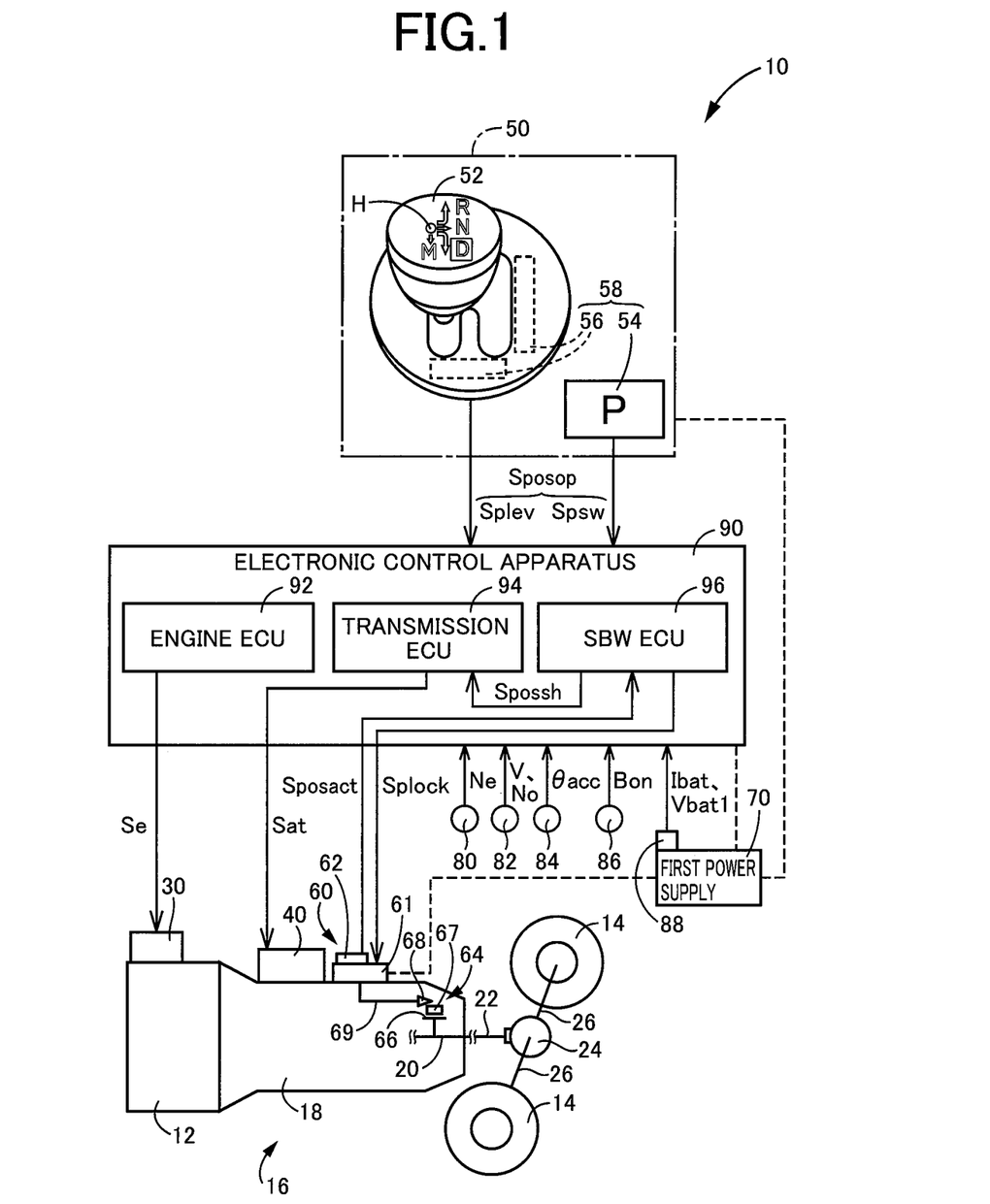
FIG. 1 is a view schematically showing a construction of a vehicle to which the present invention is applied, for explaining main parts of various control functions and control systems in the vehicle.

FIG. 1 is a view schematically showing a construction of a vehicle 10 to which the present invention is applied, for explaining major portions of control functions and control systems that are provided to perform various control operations in the vehicle 10. As shown in FIG. 1, the vehicle 10 includes an engine 12 as a power source, drive wheels 14 and a power transmission apparatus 16 configured to transmit a power from the engine 12 to the drive wheels 14.

The vehicle 10 is provided with an engine control device 30 that includes a throttle actuator, a fuel injection device and an ignition device. With the engine control device 30 being controlled by an electronic control apparatus 90 that is described below, an engine torque Te, which is an output torque of the engine 12, is controlled.

The power transmission apparatus 16 includes an automatic transmission 18, a propeller shaft 22 connected to an output shaft 20 of the automatic transmission 18, a differential device 24 connected to the propeller shaft 22, and right and left drive shafts 26 connected to the differential device 24. In the power transmission apparatus 16, the power outputted from the engine 12 is transmitted to the automatic transmission 18 connected to the engine 12, and then is transmitted from the automatic transmission 18 to the drive wheels 14 via the propeller shaft 22, the differential device 24 and the drive shafts 26, for example.

In the automatic transmission 18, a shifting action is executed depending on an accelerator opening degree θacc and a vehicle running speed V, for example, with a hydraulic actuator (provided in the automatic transmission 18) being operated by a hydraulic pressure outputted by a hydraulic control unit (hydraulic control circuit) 40 that is provided in the vehicle 10. The hydraulic control unit 40 is controlled by the electronic control apparatus 90 so as to regulate the hydraulic pressure that is to be outputted to the automatic transmission 18.

The vehicle 10 further includes a shift operation device 50, a shift-by-wire device 60 and a first power supply 70. In the vehicle 10, a shift position POSsh of the automatic transmission 18 is switched by using a shift-by-wire system. In the following description of the present embodiment, the term "shift-by-wire" will be referred also to as "SBW". The shift position POSsh of the automatic transmission 18 is synonymous with a shift range of the automatic transmission 18.

The shift operation device 50 is an operation device that is to be manually operated to select one of a plurality of positions as the shift position POSsh of the automatic transmission 18. The shift operation device 50 is operated by a vehicle driver of the vehicle 10 so as to be placed in a selected one of operation positions POSop which corresponds to the shift position POSsh of the automatic transmission 18, wherein the operation positions POSop include P, R, N, D and M operation positions. Thus, the shift position POSsh of the automatic transmission 18 is established in accordance with the selected one of the operation positions POSop.

The P operation position is a parking operation position that is to be selected for establishing a parking position in the automatic transmission 18. In the following description of the present embodiment, the parking position will be referred to as "P position". When the P position is established as the shift position POSsh of the automatic transmission 18, the power transmission apparatus 16 (i.e., the automatic transmission 18) is placed in a neutral state in which rotation of the output shaft 20 as a rotary member that is to be rotated together with the drive wheels 14 is mechanically stopped. The neutral state of the automatic transmission 18 is a state in which a power transmission is interrupted in the automatic transmission 18, namely, a state in which the automatic transmission 18 cannot transmit the power. The state in which the rotation of the output shaft 20 is mechanically stopped is a state in which the output shaft 20 is mechanically fixed so as to be unrotatable, and corresponds to a parking lock state of the automatic transmission 18. The output shaft 20 is mechanically fixed so as to be unrotatable through the shift-by-wire device (SBW device) 60.

The R operation position is a reverse-drive operation position that is to be selected for establishing a reverse drive position in the automatic transmission 18 for enabling the vehicle 10 to perform a reverse running. In the following description of the present embodiment, the reverse drive position will be referred to as "R position". The N operation position is a neutral operation position that is to be selected for establishing a neutral position in the automatic transmission 18 whereby the automatic transmission 18 is placed in the neutral state. In the following description of the present embodiment, the neutral position will be referred to as "N position". The D operation position is a forward-drive operation position that is to be selected for establishing a forward drive position in the automatic transmission 18 for enabling the vehicle 10 to perform a forward running. In the following description of the present embodiment, the forward drive position will be referred to as "D position". The M operation position is a manual-shift operation position that is to be selected for establishing a manual shift position in the automatic transmission 18 for enabling a manual shift operation in a state enabling the vehicle 10 to perform the forward running. The manual shift operation is a shift operation that is to be executed by an operation of a paddle switch or the like by the vehicle driver so as to execute the shifting action in the automatic transmission 18. In the following description of the present embodiment, the manual shift position will be referred to as "M position".

Any of the R, N, D and M positions of the automatic transmission 18 is a non-P position (i.e., non-parking position) which is other than the P position, and in which the rotation of the output shaft 20 is allowed. Any of the R, N, D and M operation positions is a non-P operation position (i.e., non-parking operation position) that is to be selected for establishing the non-P position in the automatic transmission 18. The state in which the rotation of the output shaft 20 is allowed is a state in which the output shaft 20 is released from being mechanically fixed, namely, in which a P lock state of the automatic transmission 18 is released, and is a non-parking lock (non-P lock) state of the automatic transmission 18.

The shift operation device 50 includes operation elements that are to be operated by the vehicle driver to be placed in a selected one of the operation positions POSop that correspond to the R, N, D and M positions of the automatic transmission 18. The operation elements are constituted by a shift lever 52 and a P switch 54, for example. The P switch 54 is the operation element disposed separately from the shift lever 52. The operation positions POSop of the shift lever 52 are lever positions Plev, and the operation positions POSop of the P switch 54 are P-switch ON positions Psw. Each of the shift lever 52 and the P switch 54 is a momentary-type operation element that is to be returned to its original position when no external force is applied thereto. In the following description of the present embodiment, the original position will be referred to as "home position POSopH". The shift operation device 50 includes, as one of the operation positions POSop, the home position POSopH to which the shift operation device 50 is to be returned when not being operated by the vehicle driver.

The shift lever 52 is to be operated by the vehicle driver so as to be placed in a selected one of the lever positions Plev which corresponds to a desired one of the R, N, D and M positions each corresponding to the non-P position of the automatic transmission 18 so that the automatic transmission 18 is placed in the desired one of the R, N, D and M positions as the shift position POSsh. The P switch 54 is to be operated by the vehicle driver so that the automatic transmission 18 is placed in the P position as the shift position POSsh.

The lever positions Plev of the shift lever 52 consist of an R operation position, an N operation position, a D operation position, an H operation position and an M operation position, for example (see "R", "N", "D", "H" and "M"), wherein the H operation position is the home position POSopH of the shift lever 52. When the shift lever 52 has been placed in one of the lever positions Plev which is other than the H operation position, the shift lever 52 is returned to the H operation position owing to a mechanical mechanism such as a spring, as the shift lever 52 is released by the vehicle driver.

The shift operation device 50 includes a lever position sensor 56 for detecting which one of the lever positions Plev the shift lever 52 is currently placed in. The lever position sensor 56 is a sensor configured to output a lever-position signal Splev that represents the one of the lever positions Plev in which the shift lever 52 is currently placed, such that the lever-position signal Splev is supplied to the electronic control apparatus 90. Based on the lever-position signal Splev, the electronic control apparatus 90 determines which one of the lever positions Plev the shift lever 52 is currently placed in, namely, which one of the R, N, D and M operation positions the shift lever 52 is currently placed in. An operation for placing the shift lever 52 into each of the R, N, D and M operation positions is a shift operation for switching the shift position POSsh of the automatic transmission 18 to a corresponding one of the R, N, D and M positions as the non-P position, and is referred also to as "shift lever operation".

The P switch 54 is a momentary type push button switch, and is to be subjected to a pushing operation by the vehicle driver to the P-operation position that is the P-switch ON position Psw. The P switch 54 is not subjected to the pushing operation in the home position POSopH of the P switch 54. When the P switch 54 has been subjected to the pushing operation to the P-operation position, the P switch 54 is returned to the home position POSopH owing to a mechanical mechanism such as a spring, as the P switch 54 is released. Each time the P switch 54 is pushed to the P-operation position, the P switch 54 outputs a P-switch signal Spsw corresponding to the P-operation position, to the electronic control device 90. The electronic control device 90 determines the P-switch ON position Psw based on the P-switch signal Spsw, namely, detects the operation to the P-operation position based on the P-switch signal Spsw. The operation to the P-operation position is the shift operation for switching the shift position POSsh of the automatic transmission 18 to the P position, and is referred also to as "P-switch operation".

Each of the lever-position signal Splev and the P-switch signal Spsw is a position signal Sposop representing a selected one of the operation positions POSop. The P switch 54 and the lever position sensor 56 are operation position sensors 58 each configured to output the position signal Sposop. Each of the shift lever operation and the P switch operation made by the vehicle driver is the shift operation made in the shift operation device 50 for switching the shift position POSsh of the automatic transmission 18

The SBW device 60 includes an electric actuator 61, a rotational angle sensor 62 and a parking lock mechanism 64, wherein the electric actuator 61 is constituted by a motor, for example. In the following description of the present embodiment, the electric actuator will be referred also to as "ACT". The rotational angle sensor 62 is constituted by two Hall ICs configured to detect a rotational angle of a rotor of the electric actuator 61. The rotational angle of the rotor corresponds to an ACT position POSact that is an operation position of the electric actuator 61. The rotational angle sensor 62 is a sensor configured to detect a relative position of the ACT position POSact, and to output an ACT position signal Sposact as a count value corresponding to the ACT position POSact such that the ACT position signal Sposact is supplied to the electronic control apparatus 90.

The parking lock mechanism 64 includes a parking lock gear 66, a parking lock pawl 67, a cam 68 and a parking rod 69. The parking lock gear 66 is a member that is to be rotated together with the output shaft 20. The parking lock pawl 67 has a pawl portion that is to mesh with gear teeth of the parking lock gear 66, and is a member that can mesh with the parking lock gear 66. The cam 68 is provided in a distal end portion of the parking rod 69 which is located on a side of the parking lock pawl 67. The cam 68 is a tapered member, which causes the parking lock pawl 67 to mesh with the parking lock gear 66 by being moved toward the parking lock pawl 67. The parking rod 69 holds the cam 68 provided in its distal end portion, and is mechanically connected at its proximal end portion to the electric actuator 61 through a member (not shown).

The electric actuator 61 is to be driven or operated in accordance with a P-switch control command signal Splock supplied from the electronic control apparatus 90. The P-switch control command signal Splock is a control command signal which is based on the position signal Sposop representing a selected one of the operation positions POSop and which is to be outputted from the electronic control apparatus 90, for controlling switching between the P position and the non-P position. The SBW device 60 is a P lock device configured to switch between the P lock state and the non-P lock state by operation of the electric actuator 61, and to switch the shift position POSsh of the automatic transmission 18 between the P position and the non-P position. For example, when the P switch operation of the P switch 54 is detected, the electric actuator 61 is controlled by the electronic control apparatus 90, such that the cam 68 is forced toward the parking lock pawl 67 by the electric actuator 61 whereby the parking rod 69 and the cam 68 are operated to move the parking lock pawl 67 toward the parking lock gear 66. When the parking lock pawl 67 is moved to a position in which the parking lock pawl 67 meshes with the parking lock gear 66, the output shaft 20 as well as the parking lock gear 66 is fixed to be unrotatable, so that the drive wheels 14, which are to be rotated together with the output shaft 20, are fixed to be unrotatable.

Thus, the SBW device 60 is a switch device configured to switch the shift position POSsh of the automatic transmission 18 in accordance with the P-switch control command signal Splock, by operation of the electric actuator 61. Each of the shift lever operation and the P switch operation made by the vehicle driver is a shift switch operation for causing the SBW device 60 to perform a shift switching.

The first power supply 70 is, for example, a known auxiliary device battery configured to apply a predetermined electric voltage to each of the shift operation device 50, SBW device 60 and electronic control apparatus 90. For example, the first power supply 70 supplies the electric power for driving the electric actuator 61. Further, the first power supply 70 supplies the electric power to an SBW ECU 96 (see FIG. 2) that is provided in the electronic control apparatus 90. Further, the first power supply 70 applies an electric voltage to the operation position sensors 58 for outputting the position signal Sposop representing a selected one of the operation positions POSop.

The vehicle 10 is provided with the electronic control apparatus 90 as a controller including a control apparatus for the vehicle 10. The electronic control apparatus 90 includes, for example, a so-called microcomputer incorporating a CPU, a ROM, a RAM and an input-output interface. The CPU performs various controls in the vehicle 10, by processing various input signals, according to control programs prestored in the ROM, while utilizing a temporary data storage function of the RAM. The electronic control apparatus 90 performs an output control of the engine 12, a shift control of the automatic transmission 18 and a switch control of the shift position POSsh by the SBW device 60. To this end, the electronic control apparatus 90 includes an engine ECU 92 for controlling the engine 12, a transmission ECU 94 for controlling the transmission and the SBW ECU 96 for controlling the SBW device 60.

The electronic control apparatus 90 receives various input signals based on values detected by respective sensors provided in the vehicle 10. Specifically, the electronic control apparatus 90 receives: an output signal of the P switch 54 which is the P-switch signal Spsw; an output signal of the lever position sensor 56 which is the lever-position signal Splev; an output signal of the rotational angle sensor 62 which is the ACT position signal Sposact; an output signal of an engine speed sensor 80 indicative of an engine rotational speed Ne which is a rotational speed of the engine 12; an output signal of an output speed sensor 82 indicative of an output-shaft rotational speed No which is a rotational speed of the output shaft 20 and which corresponds to a running speed V of the vehicle 10; an output signal of an accelerator-opening degree sensor 84 indicative of an accelerator opening degree $\theta acc$; an output signal of a brake switch 86 which is a brake ON signal Bon; and an output signal of a battery sensor 88 indicative of a first power supply voltage Vbat1 which is an electric voltage of the first power supply 70.

Further, the electronic control apparatus 90 generates various output signals which are supplied to various devices such as the engine control device 30, the hydraulic control unit 40 and the SBW device 60 and which include an engine control command signal Se, a transmission control command signal Sat and the above-described P-switch control command signal Splock.

The engine ECU 92 calculates a requested drive amount of the vehicle 10 requested by the vehicle driver, by applying the accelerator opening degree θacc and the vehicle running speed V, for examples, to a requested drive amount map that represents a pre-stored relationship obtained by experimentation or determined by an appropriate design theory. The requested drive amount is, for example, a requested drive torque Trdem of the drive wheels 14. The engine ECU 92 outputs the engine control command signal Se for controlling the engine 12, so as to obtain the engine torque Te that realizes the requested drive torque Trdem, by taking account of various factors such as a gear ratio of the automatic transmission 18, such that the engine control command signal Se is supplied to the engine control device 30. From another point of view, the requested drive torque Trdem [Nm] is a requested drive power Prdem [W] at the current vehicle running speed V. As the requested drive amount, another value such as a requested drive force Frdem [N] of the drive wheels 14 may be used, too.

The transmission ECU 94 determines whether a shifting action is to be executed in the automatic transmission 18, by using, for example, a shifting map that represents a predetermined relationship, and outputs the transmission control command signal Sat, as needed, which is supplied to the hydraulic control unit 40, for executing the shifting action in the automatic transmission 18. In the shifting map, the predetermined relationship is represented by shifting lines in two-dimensional coordinates in which the vehicle running speed V and the accelerator opening degree θacc as two variables are taken along respective two axes, wherein the shifting lines are used for the determination as to whether the shifting action is to be executed in the automatic transmission 18.

The SBW ECU 96 outputs the P-switch control command signal Splock and a shift-position command signal Spossh to the SBW device 60 and the transmission ECU 94, such that the shift position POSsh of the automatic transmission 18 in accordance with a selected one of the operation positions POSop in the shift operation device 50.

Figure 2:
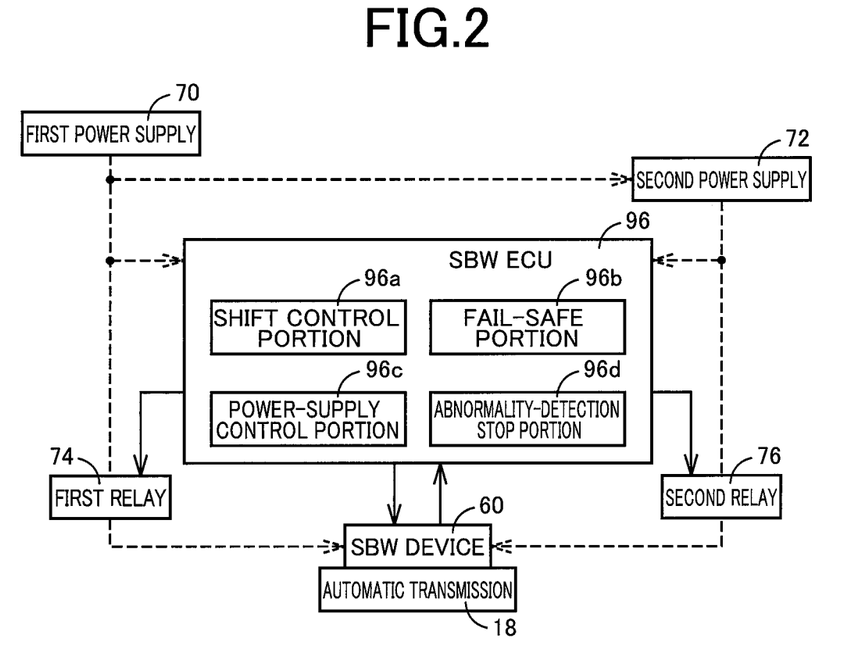
FIG. 2 is a view for explaining a construction of a control system related to an SBW ECU.

FIG. 2 is a view for explaining an example of a construction of a control system related to the SBW ECU 96. As shown in FIG. 2, The vehicle 10 has a sub-battery system so that the shift position POSsh of the automatic transmission 18 can be switched to the P position even when the electric voltage of the first power supply 70 drops. The vehicle 10 is therefore equipped with a second power supply 72 as a sub-battery connected in parallel with the first power supply 70. The second power supply 72 is supplied with the electric power from the first power supply 70, for example, via a relay (not shown). The second power supply 72 is, for example, nickel hydrogen battery, capacitor or the like. The second power supply 72 is configured to supply the electric power to the SBW ECU 96 in the same way as the first power supply 70.

The vehicle 10 is provided with a first relay 74 and a second relay 76. The first relay 74 is configured to open and close an electric power circuit between the first power supply 70 and the electric actuator 61 in the SBW device 60. When being energized by the SBW ECU 96, the first relay 74 is switched ON so as to transmit the electric power supplied from the first power supply 70 to the electric actuator 61. The second relay 76 is configured to open and close an electric power circuit between the second power supply 72 and the electric actuator 61. When being energized by the SBW ECU 96, the second relay 76 is switched ON so as to transmit the electric power supplied from the second power supply 72 to the electric actuator 61. The second power supply 72 supplies the electric power to drive the electric actuator 61 during a power-supply failure state in which the electric power to drive the electric actuator 61 is not supplied from the first power supply 70.

The SBW ECU 96 includes shift control means in the form of a shift control portion 96a, fail-safe means in the form of a fail-safe portion 96b and power-supply control means in the form of a power-supply control portion 96c.

The shift control portion 96a determines the shift operation by the vehicle driver in the shift operation device 50 based on the position signal Sposop, and sets a target position corresponding to a selected one of the operation positions POSop. The shift control portion 96a outputs a switching request (P-switch control command signal Splock, shift-position command signal Spossh) to switch the shift position POSsh of the automatic transmission 18 to correspond to the target position. For example, the shift control portion 96a controls switching of the shift position POSsh between the P position and the non-P position.

The shift control portion 96a sets the P position as the target position in case detecting input of the P-switch signal Spsw when the shift position POSsh is in the non-P position. The shift control portion 96a outputs a P lock command to the SBW device 60 as the P-switch control command signal Splock so as to switch the automatic transmission 18 to the P position. The SBW device 60 switches the automatic transmission 18 to the P lock state by operating the electric actuator 61. In addition, the shift control portion 96a outputs the shift-position command signal Spossh to the transmission ECU 94 so as to place the automatic transmission 18 into its neutral state. The transmission ECU 94 outputs the transmission control command signal Sat to the hydraulic control unit 40 so as to place the automatic transmission 18 into the neutral state.

On the other hand, in case of detecting the input of the lever-position signal Splev when the shift position POSsh is in the P position, the shift control portion 96a sets the non-P position as the target position. The shift control portion 96a outputs the P-switch control command signal Splock to the SBW device 60 so as to switch the automatic transmission 18 to the non-P position. The SBW device 60 switches the automatic transmission 18 to the non-P lock state by operation of the electric actuator 61. In addition, the shift control portion 96a sets the shift position POSsh to one of the R, N and D positions corresponding to the lever-position signal Splev as the target position. The shift control portion 96a outputs the shift-position command signal Spossh to the transmission ECU 94 so as to switch the shift position POSsh to the above-described one of the R, N and D positions. The transmission ECU 94 outputs the transmission control command signal Sat to the hydraulic control unit 40 so as to switch the shift position POSsh of the automatic transmission 18 to a position corresponding to the shift-position command signal Spossh.

The fail-safe portion 96b determines whether the drive of the electric actuator 61 has been stagnant for a predetermined length of time TMf or longer during the switching between the P position and the non-P position. For example, the fail-safe portion 96b determines, depending on whether a state in which change of the ACT position signal Sposact supplied from the rotational angle sensor 62 is smaller than a predetermined change amount has lasted for the predetermined length of time TMf or more, whether the electric actuator 61 has been stagnant for the predetermined length of time TMf or longer. The above-described predetermined change amount is, for example, a predetermined threshold value for determining that the drive of the electric actuator

61 is stagnant. The fail-safe portion 96b detects an abnormal condition of the electric actuator 61 when determining that the drive of the electric actuator 61 has been stagnant for at least the predetermined length of time TMf. The predetermined length of time TMf is a predetermined threshold value for determining that the electric actuator 61 is in an abnormal condition. The fail-safe portion 96b executes a fail-safe operation FS, which inhibits re-drive of the electric actuator 61, when the abnormal condition of the electric actuator 61 is detected.

When determining a power supply failure of the first power supply 70 during occurrence of the power-supply failure state, the power-supply control portion 96c switches a supplier of the electric power to the electric actuator 61, from the first power supply 70 to the second power supply 72. For example, the power-supply control portion 96c determines, depending on whether the first power supply voltage Vbat1 is below a predetermined voltage value Vbatf, whether the power-supply failure state of the first power supply 70 has occurred or not. The predetermined voltage value Vbatf is, for example, a predetermined threshold value for determining that the first power supply 70 is in the power-supply failure state. The power-supply control portion 96c determines whether the occurrence of the power-supply failure state has lasted for at least a predetermined failure determination time TMlps. The power-supply control portion 96c determines the power supply failure of the first power supply 70 when the occurrence of the power-supply failure state has lasted for at least the predetermined failure determination time TMlps. The predetermined failure determination time TMlps is, for example, a predetermined threshold value for reliably determining that the first power supply 70 has failed. The predetermined failure determination time TMlps is predetermined to be longer than the predetermined length of time TMf, for example. The power-supply control portion 96c switches the supplier of the electric power to the electric actuator 61, from the first power supply 70 to the second power supply 72, by switching from transmission of the electric power through the first relay 74 to transmission of the electric power through the second relay 76.

By the way, if the power-supply failure state of the first power supply 70 occurs when the electric actuator 61 is driven for switching the shift position POSsh from the non-P position to the P position, the drive of electric actuator 61 becomes stagnant. In this case, since the predetermined failure determination time TMlps is longer than the predetermined length of time TMf, the abnormal condition of the electric actuator 61 is detected before the power supply failure of the first power supply 70 is determined. Then, even if the supplier of the electric power to the electric actuator 61 has been switched from the first power supply 70 to the second power supply 72, the fail-safe operation FS is executed to inhibit the electric actuator 61 from being driven again. Consequently, the shift position POSsh cannot be switched to the P position.

Therefore, the SBW ECU 96 further includes abnormality-detection stop means in the form of an abnormality-detection stop portion 96d.

The abnormality-detection stop portion 96d is configured, when it is determined by the power-supply control portion 96c that the power-supply failure state of the first power supply 70 occurs during the switching of the shift position POSsh of the power transmission apparatus 16 from the non-P position to the P position, to stop the fail-safe portion 96b from detecting the abnormal condition of the electric actuator 61, until the supplier of the electric power to the electric actuator 61 has been switched to the second power supply 72 by the power-supply control portion 96c.

For example, the power-supply control portion 96c determines whether or not the occurrence of the power-supply failure state has lasted for at least a predetermined failure provisional-determination time TMlpsp. The power-supply control portion 96c provisionally determines the power supply failure of the first power supply 70 when the occurrence of the power-supply failure state has lasted for the failure provisional-determination time TMlpsp or longer. The failure provisional-determination time TMlpsp is set to a value shorter than the predetermined length of time TMf, for example. Thus, when the abnormal condition of the electric actuator 61 is caused by the occurrence of the power-supply failure state of the first power supply 70, the power supply failure of the first power supply 70 is provisionally determined earlier than the detection of the abnormal condition of the electric actuator 61. The fail-safe portion 96b does not allow the fail-safe portion 96b to detect the abnormal condition of the electric actuator 61, since the power supply failure of the first power supply 70 has been provisionally determined by the power-supply control portion 96c, until the supplier of the electric power to the electric actuator 61 has been switched to the second power supply 72 by the power-supply control portion 96c after the power supply failure of the first power supply 70 has been non-provisionally determined. Not allowing detection of the abnormal condition of the electric actuator 61 means that the abnormality of the electric actuator 61 is concealed or masked. Thus, when the supplier of the electric power to the electric actuator 61 has been switched to the second power supply 72, the fail-safe operation FS is not executed so that the electric actuator 61 can be driven again.

In the case of the occurrence of the power-supply failure state of the first power supply 70 determined by the power-supply control portion 96c during the switching of the shift position POSsh of the power transmission apparatus 16 from the non-P position to the P position, when the supplier of the electric power to the electric actuator 61 has been switched to the second power supply 72 by the power-supply control portion 96c, the shift control portion 96a drives the electric actuator 61 again so as to switch the shift position POSsh of the power transmission apparatus 16 to the P position.

When re-driving the electric actuator 61, the shift control portion 96a re-sets the target position to make the shift position POSsh the P position, and drives the electric actuator 61 to a position in which the automatic transmission 18 is reliably placed in the P lock state. For example, the shift control portion 96a stores the position signal Sposop at a point of stagnation of the drive of the electric actuator 61 due to occurrence of the power-supply failure state, as a drive information of the electric actuator 61. When the drive of electric actuator 61 is stagnant due to the occurrence of the power-supply failure state, the electric actuator 61 is in a free state. Therefore, the shift control portion 96a stores change of the position signal Spop during the free state as an operation information of the electric actuator 61 during the stagnation of the drive of the electric actuator 61. When the electric actuator 61 is driven again, the shift control portion 96a re-sets the target position so as to establish the P position, by using the position signal Sposop at the time of stagnation and the change of the position signal Sposop during the free state. Re-setting the target position to establish the P position means calculating an amount of drive to the P position, i.e., the amount of change in the position signal Sposop.

The fail-safe portion 96b may execute the fail-safe operation FS in a case in which the power-supply failure state occurs when the first power supply 70 is used to supply the electric power to the electric actuator 61 by the power-supply control portion 96c. In this case, even if the abnormal condition of the electric actuator 61 is masked, the electric actuator 61 is inhibited from being re-driven by the fail-safe operation FS executed as a result of occurrence of the power-supply failure state. Then, when the supplier of the electric power to the electric actuator 61 has been switched to the second power supply 72, the electric actuator 61 cannot be re-driven. Therefore, when it is determined by the power-supply control portion 96c that the power-supply failure state of the first power supply 70 occurs during the switching from the non-P position to the P position, the abnormality-detection stop portion 96d stops use of the first power supply 70 until the supplier of the electric power to the electric actuator 61 has been switched to the second power supply 72. The abnormality-detection stop portion 96d causes the power-supply control portion 96c to de-energize the first relay 74 so as to stop the use of the first power supply 70, so that the fail-safe operation FS due to the occurrence of the power-supply failure state is not executed. When the use of first power supply 70 is stopped until the supplier of the electric power to the electric actuator 61 has been switched to second power supply 72, energization of the second relay 76 is also stopped so that the use of the second power supply 72 is also stopped. Thus, the abnormality-detection stop portion 96d stops execution of the control for switching of the shift position POSsh by operation of the electric actuator 61.

Where the provisional determination of the power supply failure of the first power supply 70 is made at an earlier time, it is possible to extend performance of masking the abnormal condition of the electric actuator 61. Each of the non-provisional and the provisional determination of the power supply failure of the first power supply 70 is made based on a time for which the occurrence of the power-supply failure state has lasted. If the occurrence of the power-supply failure state is determined at an earlier time, the provisional determination of the power supply failure of the first power supply 70 is made at an earlier time. Therefore, the predetermined voltage value Vbatf for determining the power supply failure of the first power supply 70 may be set to a higher value when provisionally determining the power supply failure than when non-provisionally determining the power supply failure. That is, the power-supply control portion 96c may be configured to determine the power supply failure of the first power supply 70 when the first power supply voltage Vbat1 has not been higher than a predetermined first voltage value for at least the predetermined failure determination time TMlps that is longer than the predetermined length of time TMf, and to provisionally determine the power supply failure of the first power supply 70 when the first power supply voltage Vbat1 has not been higher than a predetermined second voltage value that is higher than the predetermined first voltage value, for at least the predetermined failure provisional-determination time TMlpsp that is shorter than the predetermined length of time TMf.

Figure 3:
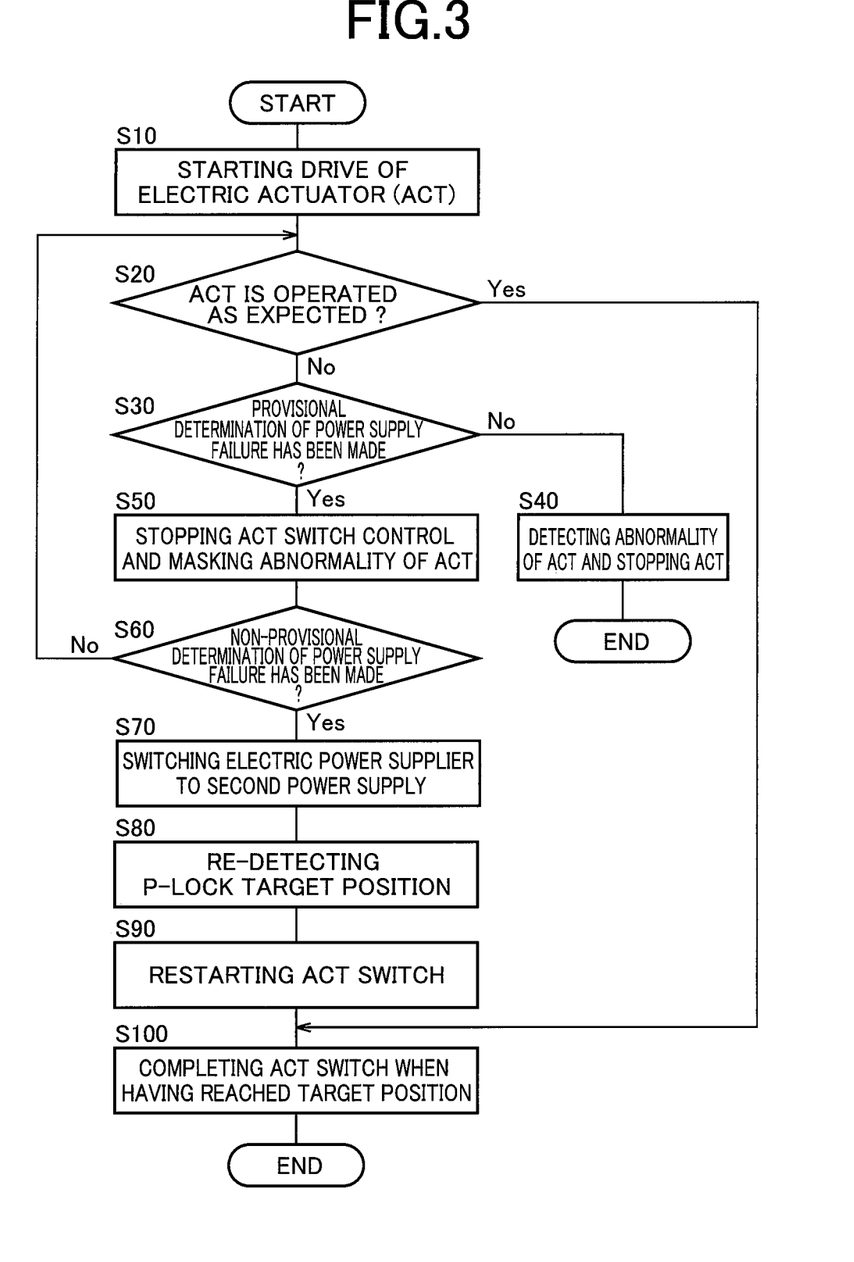
FIG. 3 is a flow chart showing a main part of a control routine executed by an electronic control apparatus, namely, a control routine that is executed for making it possible to switching a shift position of a power transmission apparatus from a non-parking position to a parking position in case of occurrence of a power-supply failure state during the switching of the shift position from the non-parking position to the parking position.

FIG. 3 is a flow chart showing a main part of a control routine executed by the electronic control apparatus 90, namely, a control routine that is executed for making it possible to switching the shift position POSsh of the power transmission apparatus 16 from the non-P position to the P position in case of the occurrence of the power-supply failure state during the switching from the non-P position to the P position. This control routine is repeatedly executed, for example, when the P lock command is outputted.

As shown in FIG. 3, the control routine is initiated with step S10 corresponding to function of the shift control portion 96a, which is implemented to start driving the electric actuator 61 so as to switch the shift position POSsh from the non-P position to the P position. Then, at step S20 corresponding to function of the fail-safe portion 96b, it is determined whether or not the electric actuator 61 is being operated as expected, depending on the change of the ACT position signal Sposact supplied from the rotational angle sensor 62. When a negative determination is made at step S20, step S30 corresponding to function of the power-supply control portion 96c is implemented to determine whether the provisional determination of the power supply failure of the first power supply 70 has been made or not. When a negative determination is made at step S30, step S40 corresponding to function of the fail-safe portion 96b is implemented to detect the abnormal condition of the electric actuator 61 and to execute the fail-safe operation FS for inhibiting the electric actuator 61 from being re-driven. When an affirmative determination is made at step S30, the control flow goes to step S50 corresponding to function of the abnormality-detection stop portion 96d, which is implemented to stop the switch control of the shift position POSsh by the electric actuator 61 and to mask the abnormal condition of the electric actuator 61. Step S50 is followed by step S60 corresponding to function of the power-supply control portion 96c, which is implemented to determine whether the power supply failure of the first power supply 70 occurs or not. When a negative determination is made at step S60, the control flow goes back to step S20. When an affirmative determination is made at step S60, step S70 corresponding to function of the power-supply control portion 96c is implemented to switch the supplier of the electric power to the electric actuator 61 from the first power supply 70 to the second power supply 72. Then, step S80 corresponding to function of the shift control portion 96a is implemented to re-set the target position so as to make the shift position POSsh the P position. Then, step S90 corresponding to function of the shift control portion 96a is implemented to re-drive the electric actuator 61 for the switching to the P position. When an affirmative determination is made at step S20, or when step S90 has been implemented, the control flow goes to step S100 corresponding to function of the shift control portion 96a, which is implemented to complete the switch control of the shift position POSsh by the electric actuator 61 when the position represented by the position signal Sposop has reached the target position.

Figure 4:
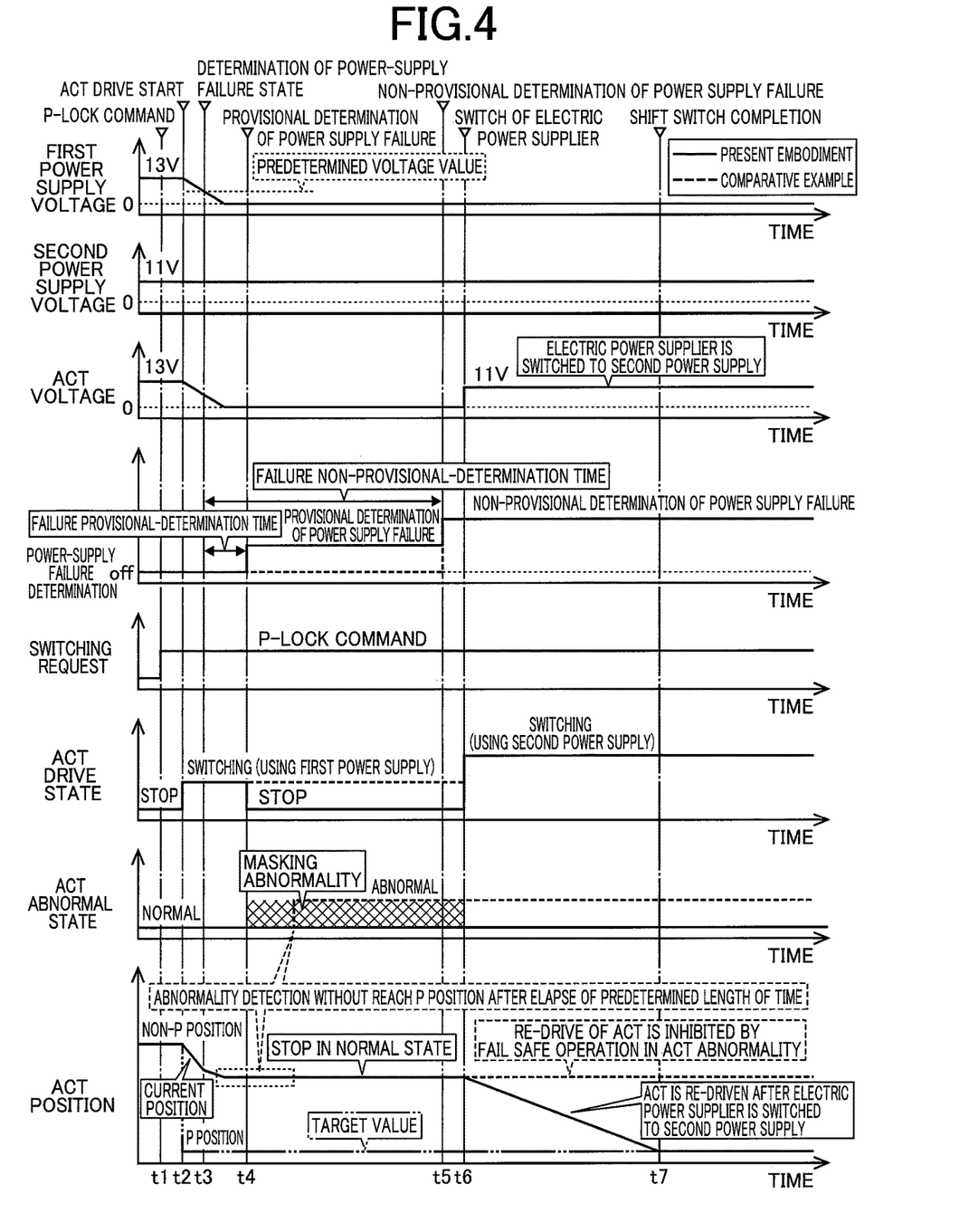
FIG. 4 is a view showing, by way of example, a time chart in a case in which the control routine is executed as shown in the flow chart of FIG. 3.

FIG. 4 is a view showing, by way of example, a time chart in a case in which the control routine is executed as shown in the flow chart of FIG. 3. In FIG. 4, a time point t1 represents a point of time at which the P lock command starts to be outputted. A time point t2 represents a point of time at which the electric actuator 61 starts to be driven for switching the shift position POSsh from the non-P position to the P position. A time point t3 represents a point to time at which the occurrence of the power-supply failure state of the first power supply 70 is determined as a result of reduction of the first power supply voltage Vbat1 to the predetermined voltage value Vbatf or lower. When the occurrence of the power-supply failure state has lasted for the predetermined failure determination time TMlps or longer, the power supply failure of the first power supply 70 is determined (at a time point t5), the supplier of the electric power to the electric actuator 61 is switched to the second power supply 72 (at a time point t6). In a comparative example indicated by broken lines, before the point of time at which the supplier of the electric power to the electric actuator 61 is switched to the second power supply 72, the abnormal condition of the electric actuator 61 is detected whereby the fail-safe operation FS is executed. Therefore, in the comparative example, even after the supplier of the electric power has been switched to the second power supply 72, the electric actuator 61 is inhibited from being re-driven due to the execution of the fail-safe operation F (see time point t6 and thereafter). On the other hand, in the present embodiment indicated by solid lines, before the abnormal condition of the electric actuator 61 is detected, the provisional determination of the power supply failure of the first power supply 70 is made since the occurrence of the power-supply failure state has lasted for at least the failure provisional-determination time TMlpsp (see time point t4 to time point t5). Then, after the provisional determination of the power supply failure is made until the supplier of the electric power is switched to the second power supply 72, the abnormal condition of the electric actuator 61 is masked (see shaded part from time point t4 to time point t6 in "ACT ABNORMAL CONDITION"). Thus, since the fail-safe operation FS is not executed, after the supplier of the electric power has been switched to the second power supply 72, the electric actuator 61 is re-driven so as to switch the shift position POSsh from the non-P position to the P position (see time point t6 to time point t7). It is noted that, in a case in which the fail-safe operation FS is executed due to occurrence of the power-supply failure state when the first power supply 70 is used as the supplier of the electric power, the use of the first power supply 70 is stopped when the provisional determination of the power supply failure is made (see time point t4 to time point t6).

As described above, in the present embodiment, in case of the occurrence of the power-supply failure state during the switching from the non-P position to the P position, the abnormal condition of the electric actuator 61 is not detected, until the supplier of the electric power to the electric actuator 61 has been switched to the second power supply 72. Owing to this control arrangement, the fail-safe operation FS is not executed until the supplier of the electric power to the electric actuator 61 has been switched to the second power supply 72, so that the re-drive of the electric actuator 61 is enabled when the supplier of the electric power to the electric actuator 61 has been switched to the second power supply 72. It is therefore possible to switch the shift position POSsh from the non-P position to the P position in case of occurrence of the power-supply failure state during the switching of the shift position POSsh from the non-P position to the P position.

In the present embodiment, the power supply failure of the first power supply 70 is provisionally determined when the occurrence of the power-supply failure state has lasted for at least the predetermined failure provisional determination time TMlpsp, wherein the failure provisional determination time TMlpsp is shorter than the predetermined length of time TMf that is used for detection of the abnormal condition of the electric actuator 61. Further, the abnormal condition of the electric actuator 61 is not detected since the provisional determination of the power supply failure of the first power supply 70 is made until the supplier of the electric power to the electric actuator 61 has been switched to the second power supply 72. Owing to this arrangement, the provisional determination of the power supply failure of the first power supply 70 is made at an earlier time than the detection of the abnormal condition of the electric actuator 61, so that it is possible to reliably avoid the fail-safe operation FS being executed when the supplier of the electric power to the electric actuator 61 has been switched to the second power supply 72.

In the present embodiment, the provisional determination of the power supply failure of the first power supply 70 is made when the first power supply voltage Vbat1 of the first power supply 70 has not been higher than the predetermined second voltage value for at least the predetermined failure provisional-determination time TMlpsp, wherein the predetermined second voltage value is higher than the predetermined first voltage value that is used for the non-provisional determination of the power supply failure of the first power supply 70, and wherein the predetermined failure provisional-determination time TMlpsp is shorter than the predetermined length of time TMf that is used for detection of the abnormal condition of the electric actuator 61. Owing to this arrangement, the provisional determination of the power supply failure of the first power supply 70 is made at a further earlier time than the detection of the abnormal condition of the electric actuator 61, so that it is possible to extend a range in which the abnormal condition of the electric actuator 61 is not detected.

In the present embodiment, in the case of the occurrence of the power-supply failure state during the switching of the shift position POSsh from the non-P position to the P position, the use of the first power supply 70 is stopped until the supplier of the electric power to the electric actuator 61 has been switched to the second power supply 72. Owing to this arrangement, when the first power supply 70 is used as the supplier of the electric power to electric actuator 61, the fail-safe operation FS due to the occurrence of the power-supply failure state is not executed.

In the present embodiment, in the case of the occurrence of the power-supply failure state during the switching of the shift position POSsh from the non-P position to the P position, when the supplier of the electric power to the electric actuator 61 has been switched to the second power supply 72, the electric actuator 61 is re-driven so as to switch the shift position POSsh to the P position. Owing to this arrangement, the shift position POSsh is switched to the P position after the supplier of the electric power to the electric actuator 61 has been switched to the second power supply 72.

In the present embodiment, when the electric actuator 61 is to be re-driven, the amount of the drive of the electric actuator 61 to the P position is calculated by using (a) the position signal Sposop at the point of time at which the drive of the electric actuator 61 has become stagnant and (b) the change of the position signal Sposop during the free state. Owing to this arrangement, the electric actuator 61 is appropriately driven such that the shift position POSsh can be switched to the P position after the supplier of the electric power to the electric actuator 61 has been switched to the second power supply 72.

While the preferred embodiment of this invention has been described in detail by reference to the drawings, it is to be understood that the invention may be otherwise embodied.

For example, where the vehicle 10 does not have a function of executing the fail-safe operation FS that is executed in case of the occurrence of the power-supply failure state when the first power supply 70 is used as the electric power supplier, it is not necessary to stop the switch control of the shift position POSsh at step S50 in the control routine shown in the flow chart of FIG. 3.

Further, in the above-described embodiment, the SBW device 60 is configured to switch the shift position POSsh of the automatic transmission 18 between the P position and the non-P position. However, this arrangement is not essential. For example, the SBW device 60 may be also a switch device configured to switch the operation position of the electric actuator 61 to positions corresponding to the respective P, R, N and D positions of the automatic transmission 18. In this case, each of positions of the electric actuator 61 corresponding to the R, N and D positions (other than the P position) of the automatic transmission 18 is the operation position of the electric actuator 61 corresponding to the non-P position of the automatic transmission 18.

Further, in the above-described embodiment, the power transmission apparatus 16 includes the automatic transmission 18, and is configured to transmit the power of the engine 12 towards the drive wheels 14. However, this arrangement is not essential. For example, the power transmission apparatus does not necessarily have to include the automatic transmission. That is, the vehicle 10 may be also a vehicle not including the automatic transmission 18 or a series hybrid electric vehicle not including the automatic transmission, for example. Further, the vehicle 10 may be also an electric vehicle which does not include the automatic transmission 18 and which is capable of performing a motor running with an electric motor driven by an electric power supplied from a battery. Where the power transmission apparatus does not include the automatic transmission, the shift position is switched by the switch device as in the automatic transmission 18, for example. Further, where the power transmission apparatus does not include the automatic transmission, the power is transmitted through a power transmission path defined by a mechanical mechanism such as a gear mechanism, and a neutral state is established with a clutch (that is provided in the power transmission path) being placed in its released state. In short, the present invention is applicable to any vehicle that includes: a power source; a power transmission apparatus configured to transmit a power from the power source toward a drive wheel; a switch device configured to switch a shift position of the power transmission apparatus by operation of an electric actuator; a first power supply configured to supply an electric power for driving the electric actuator; and a second power supply configured to supply the electric power for driving the electric actuator during a power-supply failure state in which the electric power is not supplied from the first power supply.

It is to be understood that the embodiment described above is given for illustrative purpose only, and that the present invention may be embodied with various modifications and improvements which may occur to those skilled in the art.

NOMENCLATURE OF ELEMENTS

10: vehicle
12: engine (power source)
14: drive wheel
16: power transmission apparatus
20: output shaft (rotary member)
60: shift-by-wire device (switch device)
61: electric actuator
70: first power supply
72: second power supply
90: electronic control apparatus (control apparatus)
96a: shift control portion
96b: fail-safe portion
96c: power-supply control portion
96d: abnormality-detection stop portion

What is claimed is:

1. A control apparatus for a vehicle that includes (i) a drive wheel, (ii) a rotary member that is to be rotated together with the drive wheel, (iii) a power source, (iv) a power transmission apparatus configured to transmit a power from the power source toward the drive wheel, (v) a switch device configured to switch a shift position of the power transmission apparatus by operation of an electric actuator, (vi) a first power supply configured to supply an electric power for driving the electric actuator and (vii) a second power supply configured to supply the electric power for driving the electric actuator during a power-supply failure state in which the electric power is not supplied from the first power supply, wherein the control apparatus comprises:
a shift control portion configured to control switching of the shift position of the power transmission apparatus between a parking position and a non-parking position that is other than the parking position, such that the rotary member is mechanically fixed and unrotatable when the power transmission apparatus is in the parking position;
a fail-safe portion configured to execute a fail-safe operation for inhibiting the electric actuator from being re-driven, when detecting an abnormal condition of the electric actuator with drive of the electric actuator being stagnant for at least a predetermined length of time during the switching of the shift position of the power transmission apparatus between the parking position and the non-parking position;
a power-supply control portion configured to switch a supplier of the electric power to the electric actuator, from the first power supply to the second power supply, in case of determining a power supply failure of the first power supply during the power-supply failure state; and
an abnormality-detection stop portion configured, in case of occurrence of the power-supply failure state during the switching of the shift position of the power transmission apparatus from the non-parking position to the parking position, to stop the fail-safe portion from detecting the abnormal condition of the electric actuator, until the supplier of the electric power to the electric actuator has been switched to the second power supply by the power-supply control portion.

2. The control apparatus according to claim 1,
wherein the power-supply control portion is configured to determine the occurrence of the power-supply failure state when an electric voltage of the first power supply is not higher than a predetermined voltage value, and to determine the power supply failure of the first power supply when the occurrence of the power-supply failure state has lasted for at least a predetermined failure determination time that is longer than the predetermined length of time,
wherein the power-supply control portion is configured to provisionally determine the power supply failure of the first power supply when the occurrence of the power-supply failure state has lasted for at least a predetermined failure provisional determination time that is shorter than the predetermined length of time, and
wherein the abnormality-detection stop portion is configured to stop the fail-safe portion from detecting the abnormal condition of the electric actuator, since the power supply failure of the first power supply has been provisionally determined by the power-supply control portion, until the supplier of the electric power to the electric actuator has been switched from the first power supply to the second power supply by the power-supply control portion.

3. The control apparatus according to claim 1,
wherein the power-supply control portion is configured to determine the power supply failure of the first power supply when an electric voltage of the first power supply has not been higher than a predetermined first voltage value for at least a predetermined failure determination time that is longer than the predetermined length of time, and
wherein the power-supply control portion is configured to provisionally determine the power supply failure of the first power supply when the electric voltage of the first power supply has not been higher than a predetermined second voltage value that is higher than the predetermined first voltage value, for at least a predetermined failure provisional determination time that is shorter than the predetermined length of time.

4. The control apparatus according to claim 1,
wherein the fail-safe portion is configured to execute the fail-safe operation in case of the occurrence of the power-supply failure state when the first power supply is used as the supplier of the electric power to the electric actuator by the power-supply control portion, and
wherein the abnormality-detection stop portion is configured, in the case of the occurrence of the power-supply failure state during the switching of the shift position of the power transmission apparatus from the non-parking position to the parking position, to cause the power-supply control portion to stop using the first power supply until the supplier of the electric power to the electric actuator has been switched to the second power supply by the power-supply control portion.

5. The control apparatus according to claim 1,
wherein, in the case of the occurrence of the power-supply failure state during the switching of the shift position of the power transmission apparatus from the non-parking position to the parking position, when the supplier of the electric power to the electric actuator has been switched to the second power supply by the power-supply control portion, the shift control portion is configured to re-drive the electric actuator so as to switch the shift position of the power transmission apparatus to the parking position.

6. The control apparatus according to claim 5,
wherein the shift control portion is configured, when re-driving the electric actuator, to calculate an amount of the drive of the electric actuator to the parking position, by using (a) a drive information of the electric actuator at a point of time at which the drive of the electric actuator has become stagnant due to the occurrence of the power-supply failure state and (b) an operation information of the electric actuator during stagnation of the drive of the electric actuator.

* * * * *